United States Patent [19]

Hill

[11] Patent Number: 4,860,559
[45] Date of Patent: Aug. 29, 1989

[54] INFORMATION TRANSFER
[75] Inventor: Malcolm D. Hill, Leicester, England
[73] Assignee: Camber International Limited, Leicester, England
[21] Appl. No.: 215,393
[22] Filed: Jul. 5, 1988

Related U.S. Application Data
[62] Division of Ser. No. 829, Jan. 6, 1987, abandoned.

[30] Foreign Application Priority Data
Jan. 11, 1986 [GB] United Kingdom ............... 8600629

[51] Int. Cl.$^4$ .................... D04B 35/32; D04B 15/00
[52] U.S. Cl. ........................................ 66/168; 66/232
[58] Field of Search ..................... 66/168, 219, 232

[56] References Cited

U.S. PATENT DOCUMENTS

| | | | |
|---|---|---|---|
| 3,317,735 | 5/1967 | Elsasser | 66/232 X |
| 3,327,584 | 6/1967 | Kissinger | 356/375 |
| 3,510,667 | 5/1970 | Cleveland et al. | 250/227 |
| 3,783,648 | 1/1974 | Heinrichs | 66/168 |
| 3,823,579 | 7/1974 | Schindele et al. | 66/219 |
| 3,922,063 | 11/1975 | Marrone | 350/96 C |
| 4,124,272 | 11/1978 | Henderson et al. | 350/96.21 |
| 4,167,861 | 9/1979 | Krause et al. | 66/232 X |
| 4,261,187 | 4/1981 | Yang | 66/8 X |
| 4,303,300 | 12/1981 | Pressiat et al. | 350/96.2 |
| 4,385,507 | 5/1983 | Sawazaki | 66/219 X |
| 4,398,791 | 8/1983 | Dorsey | 350/96.18 |
| 4,472,052 | 9/1984 | Lofgren | 356/44 |
| 4,529,986 | 7/1985 | d'Auria et al. | 350/96.15 |
| 4,564,755 | 1/1986 | Winzer et al. | 250/227 |
| 4,587,812 | 5/1986 | Brega | 66/232 |

FOREIGN PATENT DOCUMENTS

| | | | |
|---|---|---|---|
| 1113786 | 9/1961 | Fed. Rep. of Germany | 66/168 |
| 57-82809 | 5/1982 | Japan | |
| 58-7115 | 1/1983 | Japan | |
| 60-7415 | 1/1985 | Japan | |
| 60-100110 | 6/1985 | Japan | |
| 61-100702 | 5/1986 | Japan | |
| WO85/02270 | 5/1985 | PCT Int'l Appl. | |
| 528363 | 9/1976 | U.S.S.R. | 66/168 |

Primary Examiner—Wm. Carter Reynolds
Attorney, Agent, or Firm—Spensley Horn Jubas & Lubitz

[57] ABSTRACT

A circular knitting machine having a main supporting frame which is stationary and a plurality of operating instrumentalities arranged to move about a central axis of the machine during the knitting operation. A first control device is provided on the stationary supporting frame. A second control device is provided on a machine part which is arranged to move about said axis. The first and second control devices each include a light signal source and a light signal receptor. A first optical fiber bundle is connected to the first control device and a second optical fiber bundle is connected to the second control device. The free ends of the first and second fiber bundles are provided in a mutually opposed configuration in radial planes and centered on the machine axis. The second fiber bundle is arranged for movement with the rotary machine part so as to be rotatable about the axis. Each fiber bundle comprises two sets of optical fibers. The fibers of each set are separate from each other where connected to a respective light signal source and light signal receptor. The fibers of each set are randomly intermingled at the free ends, so as to allow simultaneous two-way transfer of information during relative rotation of the machine parts.

2 Claims, 3 Drawing Sheets

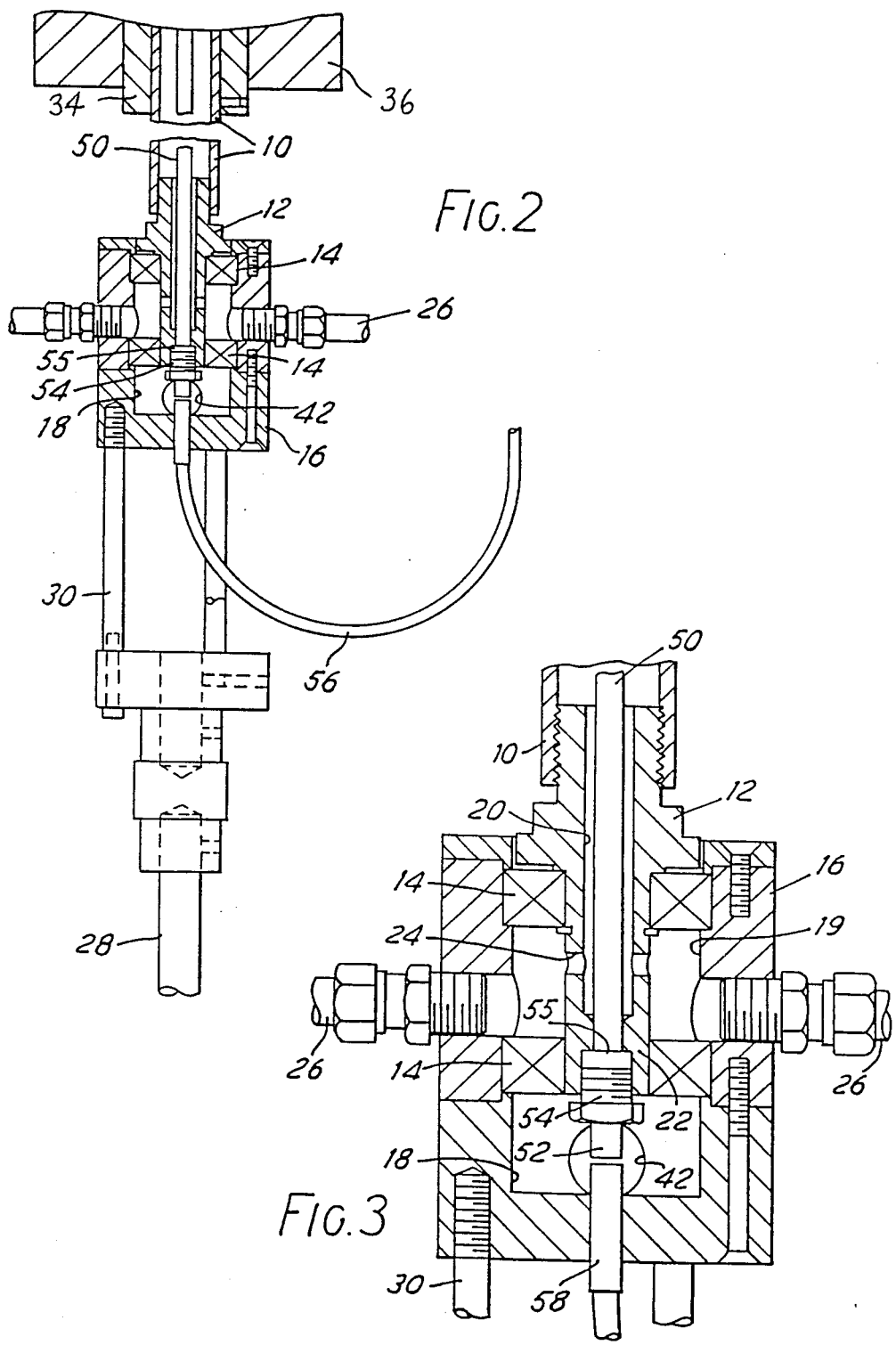

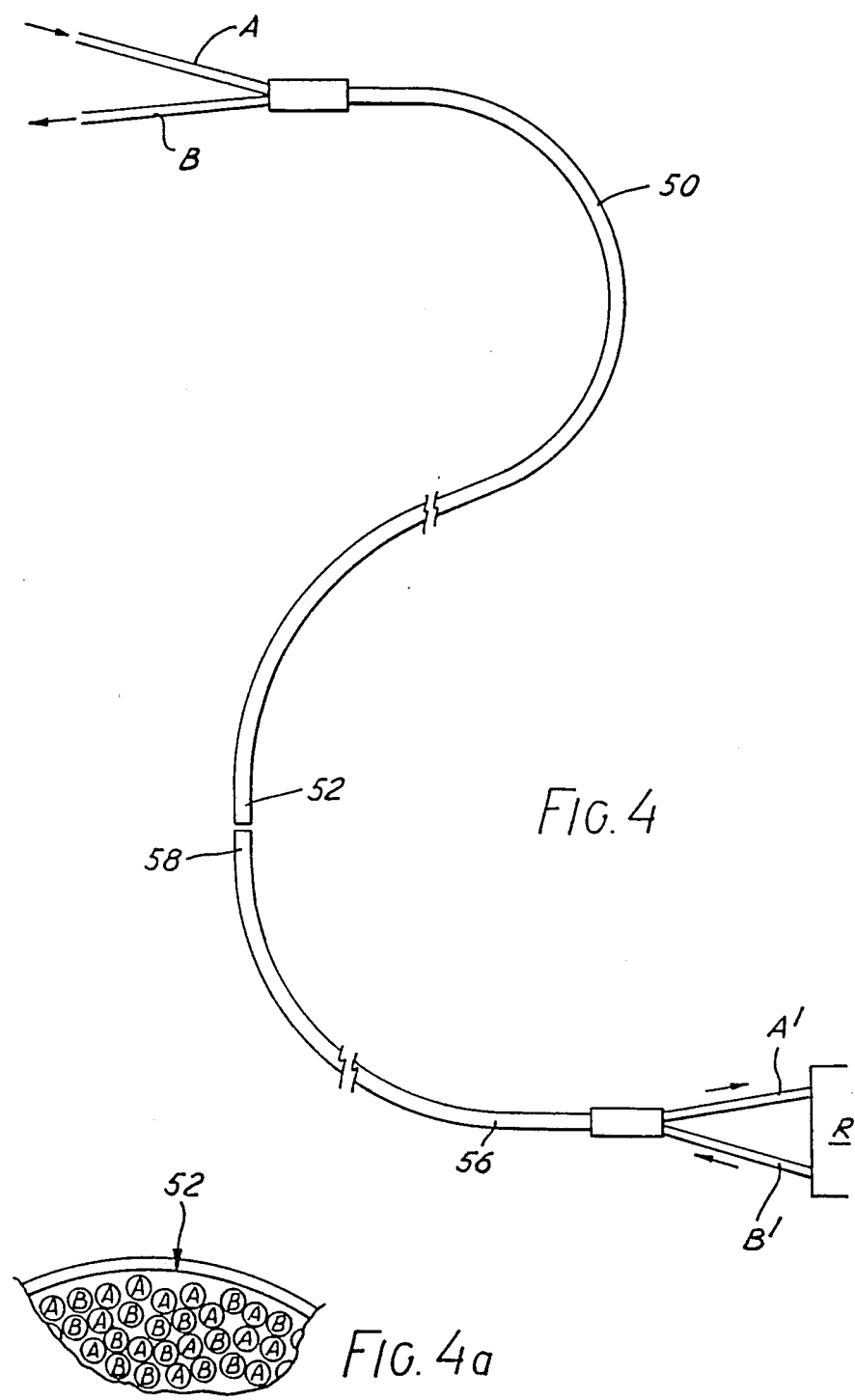

INFORMATION TRANSFER

This is a division of application Ser. No. 000,829, filed on Jan. 6, 1987 now abandoned.

The invention relates to the transfer of information through optical fibre means. Particularly it relates to the transfer of information by such means in arrangements wherein there is relative movement between two sections of optical fibre means.

It is well known to transmit information through bundles of optical fibres. However, this means of transfer has hitherto been used principally in situations where the location of the source of data is stationary with respect to the receptor location or at least any movement between the two is capable of being accommodated by the flexibility of the fibre bundles.

It is an object of the invention to provide an arrangement whereby data may be transferred between locations including parts having rotary or revolving movement therebetween.

The invention therefore provides a method of transferring information between two or more locations at least one of which is moving in a rotary or revolving manner relative to another, comprising the provision of a first length and a second length of optical fibre bundle, each length having a transverse end portion exposing cut ends of a plurality of fibres, said cut ends extending in a plane perpendicular to the longitudinal axis of the fibres, placing the two lengths of fibre bundle so that the cut ends of each bundle confront the cut ends of the other bundle, wherein the cut ends of the fibres of one bundle partake of movement about said longitudinal axis so that individual cut ends of fibres of one bundle are presented to a sequence of cut ends of fibres of the other bundle during the transfer of information.

Advantageously, the above described method may be used in a situation in which power is supplied to a machine part through an electrical slip ring and control commands and monitoring are arranged through an optical fibre arrangement. It will therefore be understood that the transfer of information may be in either direction or in both directions simultaneously.

In circumstances in which for example, two optical signals are required, the input signal and monitoring feed back signal, it will be found desirable to provide two sets of optical fibres in a single bundle and for the fibres to be separate from one another at extreme end portions of the bundle, that is adjacent the source, which may be infra-red light, and adjacent the receptor, but at least at the intermediate end portions, the fibres should be randomly intermingled or "scrambled" in order to ensure that there is passage at all times for both signals.

The invention also provides apparatus for carrying out the method of the invention comprising a source of an optical information signal and a receptor for said signal, wherein there is relative rotation between said source and said receptor, there being provided first and a second lengths of optical fibre bundle arranged to carry said signal, wherein cut ends of fibres of said first length lie in a radial plane with respect to and one the axis of said rotation and cut ends of fibres of said second length lie in said axis in a radial plane parallel to and spaced from the plane of the first mentioned cut ends.

Examples of such apparatus may find application in various fields including instrumentation measuring and the like, and in many devices including rotating parts such as jet engines. A particular example is in knitting machinery.

The invention therefore further provides a circular knitting machine having a main supporting frame which is stationary and a plurality of operating instrumentalities arranged to partake of movement about a central axis of the machine during the knitting operation, wherein there is provided a first length of optical fibre bundle arranged to commence transfer of signals from a control device which is stationary in relation to the machine frame to a second length of optical fibre bundle arranged to complete the transfer of said signals to a receptor device positioned upon a machine part that in use partakes of a rotating movement about said central axis, wherein cut ends of fibres of said first length lie stationary in a radial plane with respect to and on said axis and cut ends of fibres of said second length lie on said axis in a radial plane parallel to and spaced from the plane of said first mentioned cut ends, the second fibre length being arranged to rotate about its longitudinal axis at least at its end portion adjacent its cut fibre ends.

Conveniently, the knitting machine further comprises a slip ring arrangement to convey power to operating instrumentalities on the rotating machine parts to enable commands transferred by the optical fibre lengths thereto to be carried out.

Advantageously, where the knitting machine includes rotatable air pressure devices to remove lint from operating instrumentalities of the machine and these devices act through a stationary compressed air reservoir or suction chamber positioned on the machine axis, the first length of optical fibre bundle may be routed so as to pass generally heightwise through at least a portion of the reservoir or chamber.

Alternatively, of course, where motorised fans may be preferred for the efficient removal of lint, power for the fans may be obtained through a slip ring as mentioned in the fifth paragraph of this specification.

An example of a knitting machine arranged according to the invention will now be described with reference to the drawings. It will be understood that the description is given by way of example only and not by way of limitation.

In the drawings:

FIGS. 1 and 2 show a longitudinal section through a central region of a circular knitting machine, FIG. 2 being a continuation of FIG. 1;

FIG. 3 is a fragmentary view in section of a portion of the machine shown in FIG. 2;

FIG. 4 is a view of an optical fibre bundle used in the machine; and

FIG. 4a is a fragmentary view of an intermediate end portion of the fibre bundle of FIG. 4.

Figure 1:
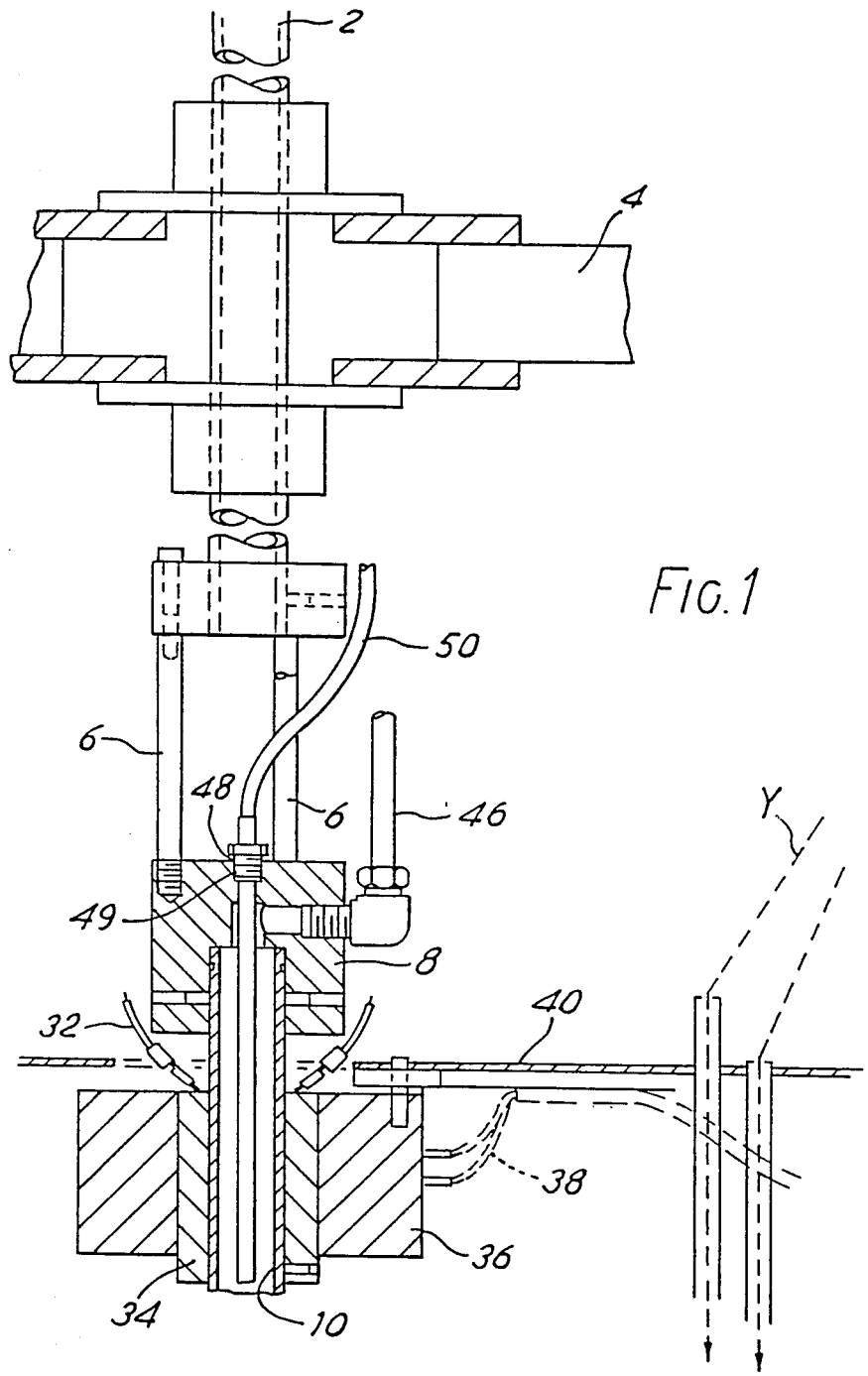

The Figures show a central region of a circular knitting machine including a needle cylinder (not shown) and various operating instrumentalities including in the present example yarn wrapping mechanisms conveniently of the type described in our co-pending British application No. 8601772 (Publication No. GB 2,171,120 A). The corresponding U.S. application is application Ser. No. 07/175,607, filed Mar. 25, 1988.

The machine is arranged about a shaft 2 on a centre line, the shaft being mounted in a support bar 4 secured to a main frame (not shown). At a lower end thereof, the shaft 2 is connected by three tie rods 6 to an upper end portion 8 of an elongate reservoir 10 for compressed air. The lower end closure member 12 of the reservoir 10 is provided with completely air-tight, permanently sealed bearings 14 about which is mounted for rotary movement a cylindrical member 16 having an internal chamber 18.

The closure member 12, which has a central passageway 20, comprises an extension portion 22 which is received within the chamber 18 and includes apertures 24 (FIG. 3) which provide communication between the interior of the reservoir and an upper portion 19 of the chamber 18. The outer walls of the chamber are formed by the rotating cylindrical member 16 from which lead four pipes 26 (two shown) through which compressed air may be directed at the needles of the needle cylinder to remove lint as the member 16 and the pipes 26 rotate during machine operation.

Also mounted for rotation with the air pipes 26 and the member 16 is a lower shaft 28 secured to the member 16 by tie rods 30 and arranged to support spreader means (not shown) for the fabric knitted by the machine.

Electrical power is provided to the rotating parts of the machine by a cable means 32 leading to a slip ring arrangement 34 mounted upon the casing of the reservoir 10. The associated brush assembly 36 which rotates about the arrangement 34 is provided with leads 38 which take the power to rotating parts such as a striper selector unit (not shown), or wrapper devices for yarns Y.

Compressed air required to be directed at the needles through the pipes 26 is supplied to the reservoir 10 through a pipe 46 secured to an inlet in the upper end portion 8 of the reservoir. A lint guard 40 is provided to act as a barrier for air borne lint.

Also provided in the upper end portion 8 of the reservoir 10 is an inlet secured and sealed by a tubing nut 48 and olive 49 for a bundle of optical fibres 50. The bundle is lead downwardly through the chamber of the reservoir 10 and an end portion 52 of the bundle is sealed in and secured by a tubing nut 54 and olive 55 fixed co-axially within the bore of the stationary extension portion 22 of the closure member 12. The end portion of the bundle has been severed in a radial plane relative to its axis which is co-axial with that of the machine. The cut ends of the fibres therefore all lie in the radial plane.

A further length of optical fibre bundle 56 is secured co-axially in the rotary cylindrical member 16 so that an end portion 58 projects inwardly into the cylindrical member 16 so that said end portion 58 is also severed in a radial plane in which lie the cut fibre ends. It is arranged that the two sets of fibre ends confront each other and are separated by the optimum gap which permits free relative movement therebetween. Access to the two sets of fibre ends for cleaning and the accurate setting of the gap is afforded by the provision of a closable inspection aperture 42 in the wall of the chamber 18.

Because it is required for signals not only to be transferred from the bundle 50 to the bundle 56 as they are conveyed to the rotational operating instrumentalities to initiate and control their operation, but also to transfer a feed-back signal to monitor the satisfactory operation of the instrumentalities. It is therefore convenient for two sets of fibres A, B in the bundles to be separate at extreme ends thereof so that an infra-red light source provides light along the outgoing set of fibres A only and is received at the receptor R through one set A', the feed back signal being relayed through the other set of fibres B' which which transfer the signal to the fibre set B.

However, because of the relative rotational movement between the two intermediate end portions 52 and 58, it is necessary in order for there to be passage at all times for both signals, for the fibres to be intermingled as shown in FIG. 4a.

Various modifications may be made within the scope of the invention as defined in the following claims.

I claim:

1. A circular knitting machine comprising:
   a stationary part,
   a rotary part having an axis of rotation,
   a first optical fiber bundle,
   a second optical fiber bundle,
   the first optical fiber bundle having a first end and a second end, the first end of the first optical fiber bundle being operatively connected to the stationary part,
   the second optical fiber bundle having a first end and a second end, the first end of the second optical fiber bundle being operatively connected to the rotary part,
   the second ends of the first and second optical fiber bundles being provided in mutually opposed configuration in radial planes and centered on the axis of rotation of the rotary part,
   the second optical fiber bundle being arranged for movement with the rotary part so as to be rotatable about the axis of rotation of the rotary part,
   the first optical fiber bundle having a first set of optical fibers and a second set of optical fibers, the first set of optical fibers and the second set of optical fibers being separated from each other at the first end of the first optical fiber bundle, the first set of optical fibers and the second set of optical fibers being randomly intermingled at the second end of the first optical fiber bundle,
   the second optical fiber bundle having a first set of optical fibers and a second set of optical fibers, the first set of optical fibers and the second set of optical fibers being separated from each other at the first end of the second optical fiber bundle, the first set of optical fibers and the second set of optical fibers being randomly intermingled at the second end of the second optical fiber bundle,
   whereby simultaneous two-way transfer of optical information during rotation of the rotary part is enabled, and further comprising:
   slip ring means for conveying power to the rotary part, whereby commands transferred to the rotary part by the optical fiber bundles may be carried out,
   a plurality of rotatable air pressure devices for removing lint from the machine, the rotatable air pressure devices acting through a stationary air pressure chamber positioned on the rotary axis, a portion of the first optical fiber bundle being routed so as to pass through at least a portion of the stationary air pressure chamber,
   a rotary member rotatable about the rotary axis and including a further chamber,
   the stationary air pressure chamber being provided with an extension portion through which a portion of the first optical fiber bundle passes so as to be on the rotary axis,
   a portion of the second optical fiber bundle being mounted in the rotary member so as to lie on the rotary axis, and
   the further chamber having walls defining passages for air from the stationary air pressure chamber to the further chamber.

2. A machine as claimed in claim 1, wherein the walls of the chamber 1 include an inspection port adjacent the opposing ends of the first and second fiber bundles.

* * * * *